US011625817B2

(12) United States Patent
Tuna et al.

(10) Patent No.: US 11,625,817 B2
(45) Date of Patent: Apr. 11, 2023

(54) PYRAMID-BASED TONE MAPPING

(71) Applicant: BEIJING XIAOMI MOBILE SOFTWARE CO., LTD., Beijing (CN)

(72) Inventors: Uygar Tuna, Tampere (FI); Murat Birinci, Tampere (FI); Petteri Kyrönlahti, Tampere (FI); Tapio Finnilä, Tampere (FI)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 64 days.

(21) Appl. No.: 17/319,073

(22) Filed: May 12, 2021

(65) Prior Publication Data

US 2021/0366086 A1 Nov. 25, 2021

(30) Foreign Application Priority Data

May 22, 2020 (EP) .................................... 20176101

(51) Int. Cl.
*G06T 5/00* (2006.01)
*G06T 3/40* (2006.01)
(Continued)

(52) U.S. Cl.
CPC ............... *G06T 5/009* (2013.01); *G06T 3/40* (2013.01); *G06T 5/20* (2013.01); *G06T 5/50* (2013.01);
(Continued)

(58) Field of Classification Search
CPC .......... G06T 2207/20016; G06T 5/009; G06T 2207/20208; G06T 5/007; G06T 5/40; H04N 1/6027
See application file for complete search history.

(56) References Cited

U.S. PATENT DOCUMENTS

| 2002/0071600 A1* | 6/2002 | Yamada | ............... | A61B 6/5258 |
| | | | | 382/132 |
| 2004/0101207 A1 | 5/2004 | Langan | | |

(Continued)

FOREIGN PATENT DOCUMENTS

| JP | H05244508 A | 9/1993 |
| JP | 2001056856 A | 2/2001 |

(Continued)

OTHER PUBLICATIONS

Paris, Sylvain, Samuel W. Hasinoff, and Jan Kautz. "Local laplacian filters: edge-aware image processing with a laplacian pyramid." ACM Trans. Graph. 30.4 (2011): 68.*
Durand, Fredo et al., "Fast Bilateral Filtering for the Display of High-Dynamic-Range Images", Jul. 1, 2002, (10p).
(Continued)

*Primary Examiner* — Li Liu
(74) *Attorney, Agent, or Firm* — Arch & Lake LLP

(57) ABSTRACT

A methods and apparatuses for image processing are provided. The method may include acquiring initial image data from an image sensor. The method may further include deconstructing the initial image data in a plurality of image pyramid layers. The method may further include collapsing a first image pyramid layer with a second image pyramid layer in order to create an intermediate layer. The method may further include collapsing the intermediate layer with the subsequent image pyramid layer to create a new intermediate layer and generating the final image based on the new intermediate layer and a last image pyramid layer. A tone-mapping operator is applied to at least one of the intermediate layers.

19 Claims, 9 Drawing Sheets

(51) Int. Cl.
　　　*G06T 5/20*　　　(2006.01)
　　　*G06T 5/50*　　　(2006.01)

(52) U.S. Cl.
　　　CPC ............... *G06T 2207/20016* (2013.01); *G06T 2207/20024* (2013.01)

(56) References Cited

U.S. PATENT DOCUMENTS

| | | | |
|---|---|---|---|
| 2010/0142790 | A1 | 6/2010 | Chang |
| 2012/0082397 | A1* | 4/2012 | Zhai .................. G06T 5/009 382/274 |
| 2017/0161882 | A1* | 6/2017 | Mantiuk .............. A61B 3/024 |
| 2022/0164931 | A1* | 5/2022 | Atkins ................ H04N 19/117 |

FOREIGN PATENT DOCUMENTS

| | | | |
|---|---|---|---|
| JP | 2009516882 A | 4/2009 | |
| KR | 10-2008-0056969 A | 6/2008 | |
| KR | 10-2012-0039546 A | 4/2012 | |

OTHER PUBLICATIONS

Eilertsen, G. et al., "A Comparative Review of Tone-Mapping Algorithms for High Dynamic Range Video", Eurographics 2017, vol. 36, No. 2, STAR—State of The Art Report, May 1, 2017, (28p).
Farbman, Zeev et al., "Edge-Preserving Decompositions for Multi-Scale Tone and Detail Manipulation", Aug. 1, 2018, (10p).
Fattal, Raanan et al., "Gradient Domain High Dynamic Range Compression", Jul. 1, 2002, (8p).
Paris, Sylvain et al., "Local Laplacian Filters: Edge-aware Image Processing with a Laplacian Pyramid", Feb. 23, 2015, (11p).
Reinhard, Erik et al., "Photographic Tone Reproduction for Digital Images", Jul. 1, 2002, (10p).
Supplementary European Search Report in the European Application No. 20176101.2, dated Oct. 22, 2020, (7p).
First Office Action of the Korean Application No. 10-2021-0061005, dated May 2, 2022 with English translation, (12p).
First Office Action of the Japanese Application No. 2021-080483, dated Jul. 19, 2022, (5p).
Zhiwei Tang et al. "Multiscale Display Processing of Radiographic Images Acquired with a Protoype Flat Panel Detector" 2005 IEEE Engineering in Medicine and Biology 27th Annual Conference, Apr. 10, 2006. https://sci-hub.se/10.1109/IEMBS.2005.1616012, (3p).

\* cited by examiner

6A

6B

6C

PYRAMID-BASED TONE MAPPING

CROSS-REFERENCE TO RELATED APPLICATION

The present Application is based upon and claims priority to EP Application No. EP20176101.2, filed on May 22, 2020, the contents of which are incorporated herein by reference in their entirety for all purposes.

TECHNICAL FIELD

This disclosure is related to image processing method, more specifically to a tone-mapping method and device for implementing the method.

BACKGROUND

Recently, digital cameras and image sensors can only capture a limited range of the dynamic range that exists in real life. Furthermore, the viewing environment, such as a mobile device display, a computer display, TVs etc., for the captured image may support an even more narrow dynamic range than what the digital cameras and image sensors can capture.

To mitigate this problem a tone mapping process is applied to the captured image data. Tone mapping is a process of mapping the image pixels representing relatively high dynamic range to a viewing environment, i.e., displaying media, with relatively lower dynamic range. While doing this, tone mapping process is responsible to provide images to be represented as close as possible to the real-world scene. Therein tone mapping is one of the crucial blocks of the image processing between capturing of the image data towards the final image presented to the viewer which is responsible for altering the image contrast and brightness in order to successfully transform/map the original high dynamic range of the real-world to an image being displayed on a lower dynamic range displays.

Among other, pyramid-based tone mapping algorithms are well known to enhance the dynamic range of images. Therefore, the image data is deconstructed into a plurality of N levels or layers. The first level, in a Gaussian-pyramid algorithm for example, is a Gaussian-filtered image of the initial image data with a reduced resolution. The second level is a Gaussian-filtered image of the first level with reduced resolution with respect to the first level and so on up to the top level. Other filters, such as a Laplacian-filter, can be used instead of the Gaussian-filter for deconstructing the initial image data into the plurality of levels. Subsequently, the contrast of one or more levels is adapted accordingly and afterwards the levels are collapsed to form the final image with an enhanced dynamic range beginning with the top level. However, due to the limited dynamic range of the digital imaging sensors and the image viewing media, i.e., displays, the scene is usually underexposed in order to avoid burning/saturating the highlights with the cost of underexposed dark shadow regions. Thus, the known mapping algorithms deliver unacceptable results of the final image with a loss of details and insufficient dynamic range.

SUMMARY

The present disclosure relates to a method for image processing. It is an object of the present disclosure to provide an image processing method, in particular a tone-mapping method to improve the dynamic range of a final image.

According to a first aspect of the present disclosure, a method for image processing is provided. The method may include acquiring initial image data. The method may further include deconstructing the image data in a plurality of N image pyramid layers. The method may further include collapsing a first image pyramid layer with a second image pyramid layer in order to create an intermediate layer. The method may further include collapsing the intermediate layer with a subsequent image pyramid layer to create a new intermediate layer and generate the final image based on the new intermediate layer and a last image pyramid layer. A tone-mapping operator is applied to at least one of the intermediate layers.

According to a second aspect of the present disclosure, an image signal processor (ISP) configured to carry out a method for image processing is provided. The method may include acquiring initial image data. The method may further include deconstructing the image data in a plurality of N image pyramid layers. The method may further include collapsing a first image pyramid layer with a second image pyramid layer in order to create an intermediate layer. The method may further include collapsing the intermediate layer with a subsequent image pyramid layer to create a new intermediate layer and generate the final image based on the new intermediate layer and a last image pyramid layer. A tone-mapping operator is applied to at least one of the intermediate layers.

According to a third aspect of the present disclosure, a terminal device is provided. The terminal device may include an image signal processor (ISP) and an image sensor connected to the ISP to acquire the image data and providing the image data to the ISP, wherein the ISP is configured to carry out a method for image processing. The method may include acquiring initial image data. The method may further include deconstructing the image data in a plurality of N image pyramid layers. The method may further include collapsing a first image pyramid layer with a second image pyramid layer in order to create an intermediate layer. The method may further include collapsing the intermediate layer with a subsequent image pyramid layer to create a new intermediate layer and generate the final image based on the new intermediate layer and a last image pyramid layer. A tone-mapping operator is applied to at least one of the intermediate layers.

It is to be understood that both the foregoing general description and the following detailed description are examples only and are not restrictive of the present disclosure.

BRIEF DESCRIPTION OF THE DRAWINGS

The present disclosure is further described with reference to the accompanied figures. The figures show.

DETAILED DESCRIPTION

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of example embodiments do not represent all implementations consistent with the disclosure. Instead, they are merely examples of apparatuses and methods consistent with aspects related to the disclosure as recited in the appended claims.

The terminology used in the present disclosure is for the purpose of describing particular embodiments only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment" depending on the context.

Figure 1:
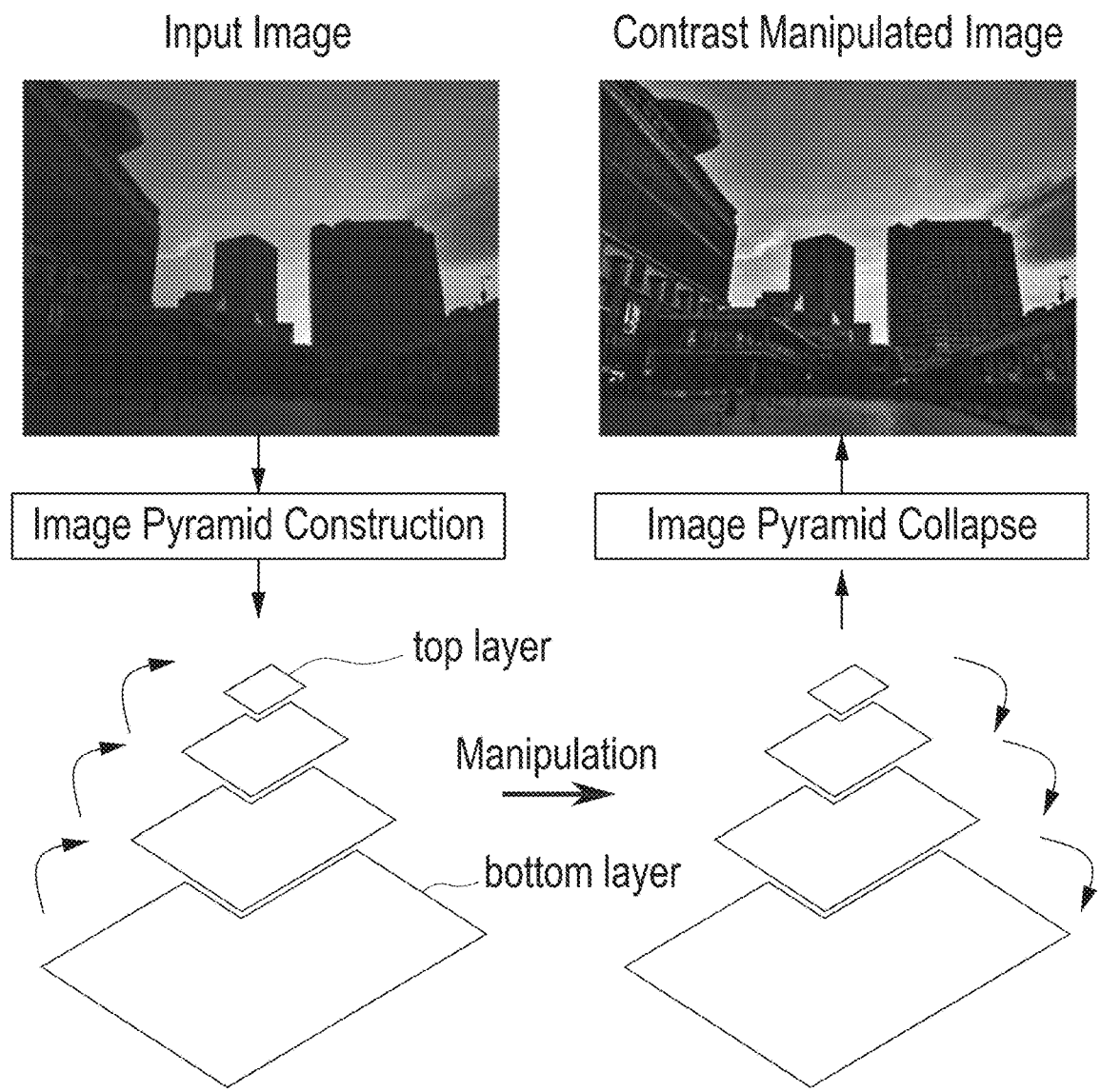
FIG. 1 illustrates an example of a Pyramid based tone-mapping process, according to an example of the present disclosure.

FIG. 1 shows an example of a Pyramid based tone-mapping process which might be implemented as Laplacian-Pyramid based tone-mapping process starting with an input image as initial image data from an image sensor. This image data is deconstructed into an image pyramid with a plurality of N image pyramid layers. In the example given of FIG. 1 is N=4 wherein for the Laplacian-Pyramid based image pyramid a Laplacian-filter is applied to the initial image data of the input image for k=1, i.e., the bottom layer. Subsequently, a Laplacian-filter is applied to the bottom layer in combination with a down-sampling step to generate the next image pyramid layer k=2. This step is further carried out until the top level with k=N is reached. Therein, the number N may depend on the resolution of the input image or might be selected in dependence on other parameters, such as computational capacity or the like. Afterwards the Laplacian image pyramid is collapsed starting with the top level, level by level down to the bottom level wherein during the process of collapsing a brightness manipulation is applied to intermediate levels generated during the collapsing process. When all layers of the Laplacian image pyramid are collapsed, the final image is generated comprising an improved dynamic range wherein shadow regions are brightened up, dark objects in the relatively bright area remain untouched without degrading of the contrast in the image.

Figure 2:
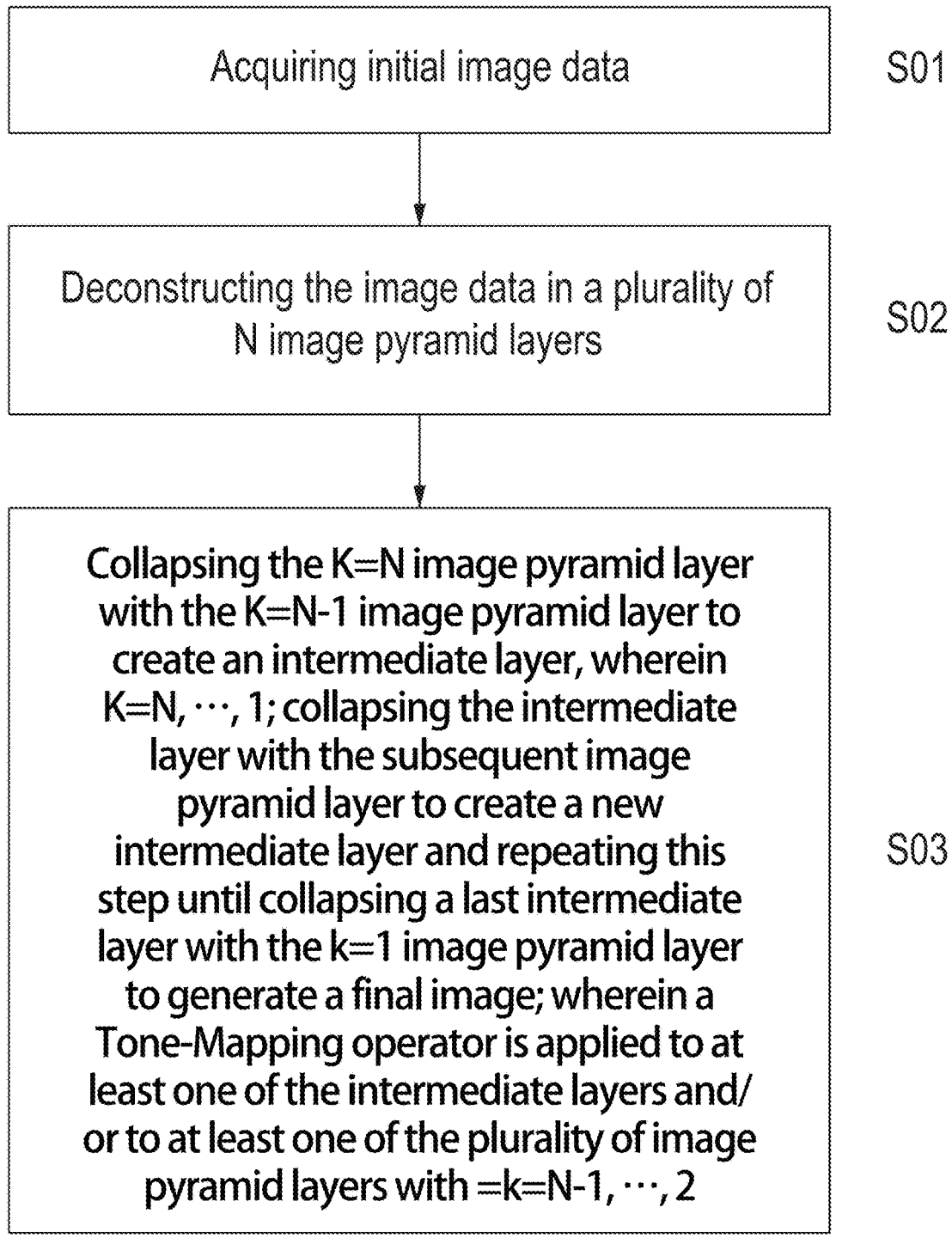
FIG. 2 illustrates a first embodiment, according to an example of the present disclosure.

FIG. 2 shows a schematic representation of the method of the present disclosure with the first step S01 of acquiring initial image data from an image sensor;

In step S02 the initial image data is deconstructed into a plurality of N image pyramid layers.

In step S03 first the k=N layer is collapsed with the k=N−1 layer in order to create an intermediate layer. Subsequently, the intermediate layer is collapsed with a subsequent image pyramid layer with k=N−2 to create a new intermediate layer and repeating this step for k=N, ..., 1 until collapsing the last intermediate layer with the k=1 layer to generate the final image wherein a tone-mapping operator is applied to at least one of the intermediate layers. The k=N layer may include, for example, a first image pyramid layer. The k=N−1 layer may include, for example, a second image pyramid layer. The k=1 layer may include, for example, a last image pyramid layer.

The collapse of the Laplacian-Pyramid is described by $$Img_k(i,j)=\text{Upscale}(Img_{k+1}(i,j))+L_k(i,j) \quad \text{with} \quad k=N-1,\ldots,1$$

$$Img_k(i,j)=L_k(i,j), \text{ where } k=N, \text{ i.e., the top layer.}$$

Therein, $L_k(i,j)$ being the Laplacian image pyramid layer of the k image pyramid layer, UPSCALE is a resolution adaption function between the k+1 image pyramid layer and the k image pyramid layer, $IMG_k$ with k=N, ..., 1 being respective intermediate layer, wherein $IMG_{k=1}$ being the final image. Further, i,j denote the pixel indices of the respective images.

During the image pyramid collapse, after collapsing a certain level and generating the respective intermediate layer, tone-mapping of the intermediate level is applied before collapse with the next level is continued. This additional step is provided by $$Img_k(i,j)=\text{ToneMapping}(Img_k(i,j)).$$

Figure 3:
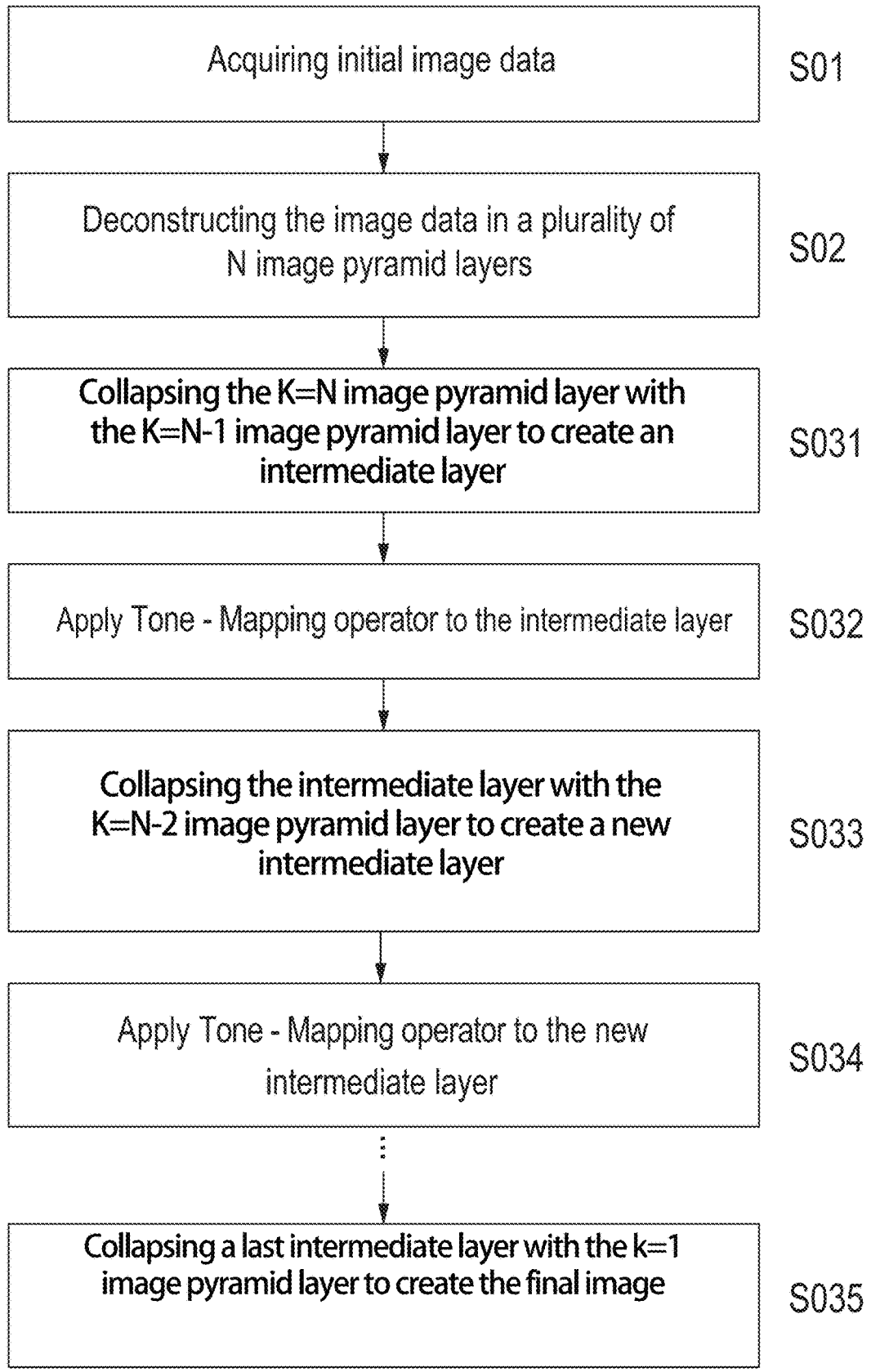
FIG. 3 illustrates a second embodiment, according to an example of the present disclosure.

Therein, the tone-mapping operator can be applied only to one of the intermediate layers. In at least some embodiments, the tone-mapping operator is applied to more than one intermediate layer and to each of the intermediate layers. In this case, before collapse of an image pyramid layers with the previous intermediate layer a tone-mapping operator is applied to the intermediate layer. This situation is schematically depicted in FIG. 3 and S031.

In step S031 the k=N image pyramid layer is collapsed with the k=N−1 image pyramid layer to create an intermediate layer. In step S032 a first tone-mapping operator is applied to the intermediate layer. Afterwards, the manipulated intermediate layer is collapsed with the k=N−2 image pyramid layer in step S033 in order to create a new intermediate layer. In step S034 a further tone-mapping operator is applied to the new intermediate layer before collapsing the new intermediate layer with the next image layer. These steps are repeated until the bottom layer with k=1 is reached as final image. Thus, after each step of creating a new intermediate layer by collapsing the previous intermediate layer with the respective pyramid image layer a tone-mapping operator is applied to this intermediate layer.

Therein, the tone-mapping operator might be implemented as a brightness manipulation. The brightness manipulation might be provided as one of a functional relationship, a Gamma-function (also known as Gamma-correction) or a contrast enhancing sigmoid function.

In at least some embodiments, the brightness manipulation is provided as Look-Up-Table (LUT).

Figure 4:
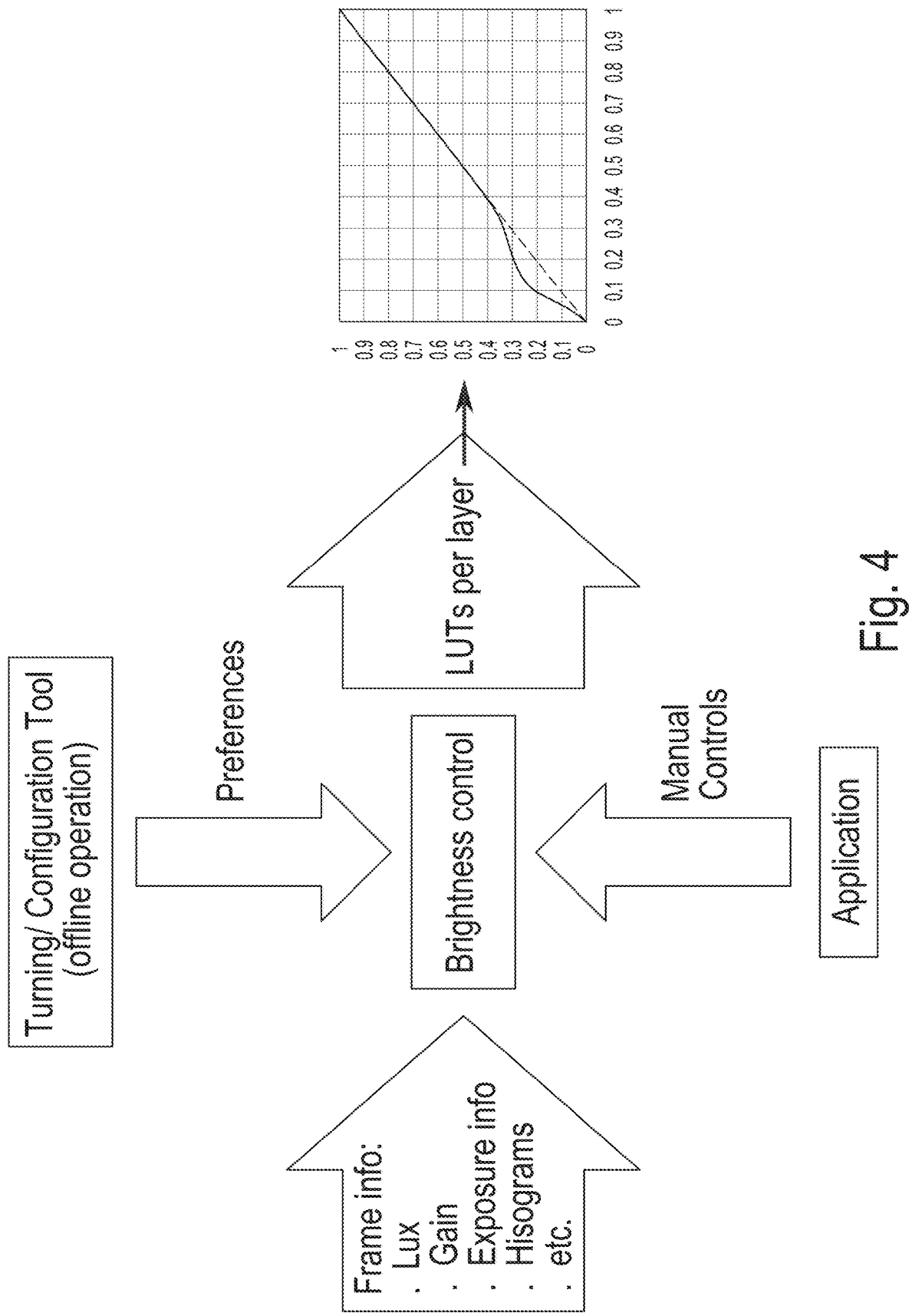
FIG. 4 illustrates determination of a Look-Up-Table, according to an example of the present disclosure.

As depicted in FIG. 4 the brightness manipulation can be provided by a brightness control which is configured to generate LUTs for each layer to be applied to individually. Therein, the brightness control might consider user preferences or manual controls of the application, tuning/configuration parameters as well as frame information such as lux, gain, exposure info, histograms etc. From this information together the brightness control generates the LUTs applied to the individual layers. However, the present disclosure is not limited to a specific LUT or brightness manipulation.

Figure 5:
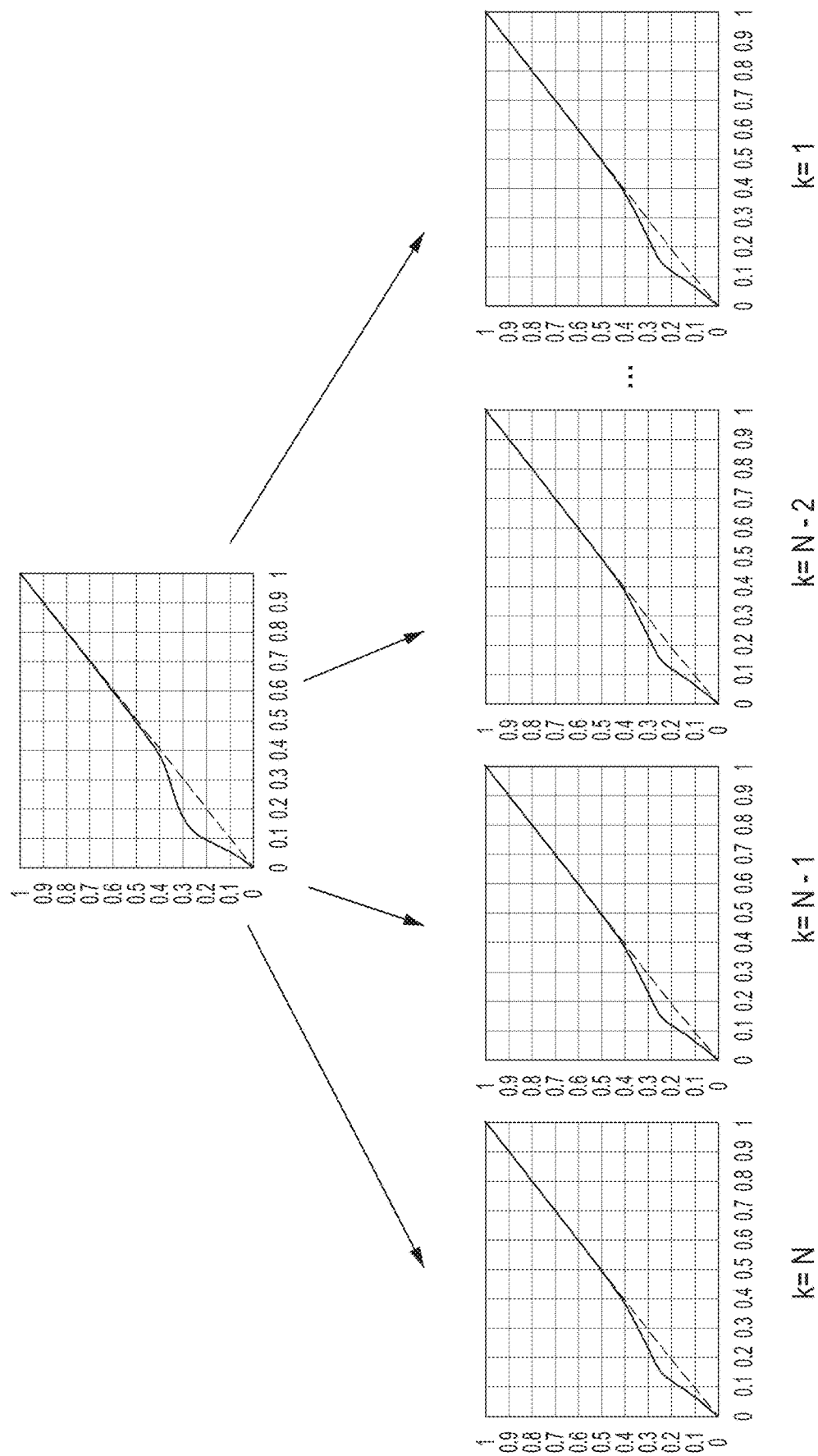
FIG. 5 illustrates distribution of the brightness manipulation, according to an example of the present disclosure.

The overall or total brightness manipulation applied to the image to achieve the desired result can be distributed among the different layers. This is shown in FIG. 5. In the top of FIG. 5 the total brightness manipulation to be applied to the image is depicted as an example. Different LUTs can be implemented as described above. This total brightness manipulation is distributed among brightness manipulation of the one or more intermediate layers. Therein, the total brightness manipulation can be evenly distributed among the different layers. Alternatively, the total brightness manipulation can be applied differently to different intermediate layers. In this case the LUT for the different layers are different.

Figure 6:
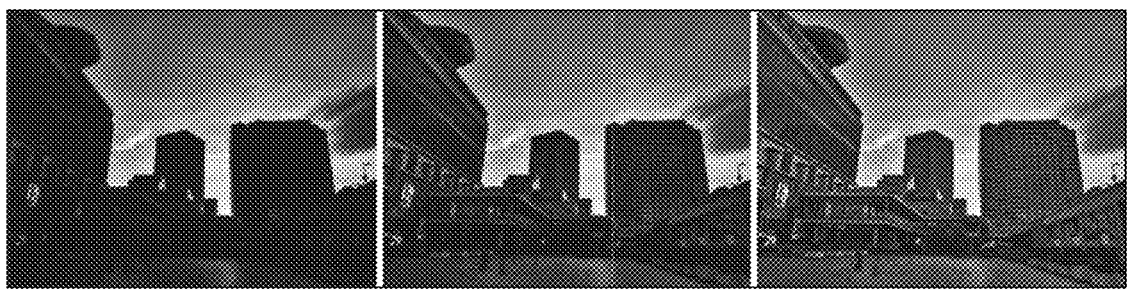
FIG. 6A illustrates a comparison of the results based on enhancement of shadow regions, according to an example of the present disclosure.
FIG. 6B illustrates a comparison of the results based on enhancement of shadow regions, according to an example of the present disclosure.
FIG. 6C illustrates a comparison of the results based on enhancement of shadow regions, according to an example of the present disclosure.
Figure 6:
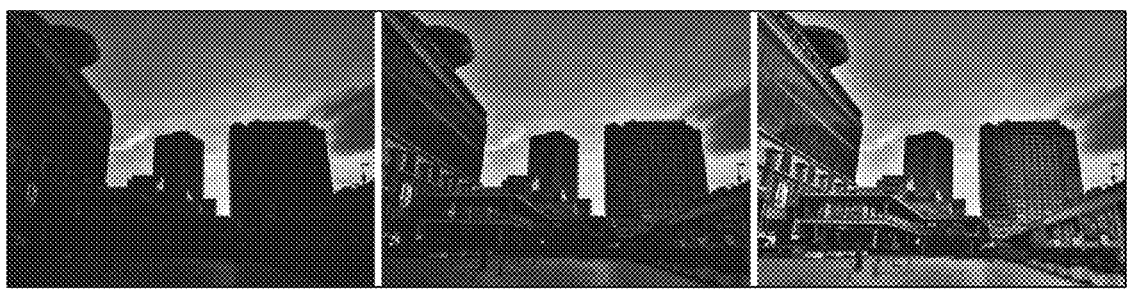
Figure 6:
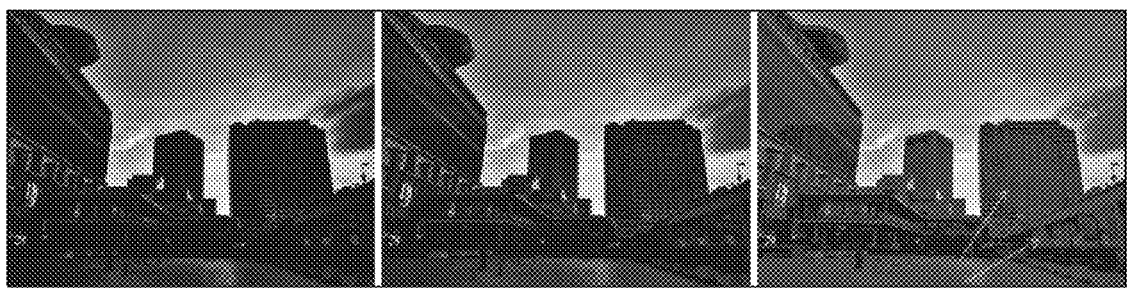

FIG. 6A shows and example of the method according to the present disclosure enhancing the shadow regions from left to right gradually using a brightness manipulation distributed among the intermediate layers applied during the image pyramid collapse. Therein, the contrast of the image is preserved and only the shadow regions are brightened up enhancing the dynamic range and providing a user pleasing representation of the real scene.

As comparison, FIG. 6B shows enhancement of shadow regions from left to right gradually using a brightness manipulation applied only to the top layer of the Laplacian-Pyramid resulting in an uneven distribution of brightness and artifacts i.e., underexposed areas. Similarly, in FIG. 6C shows an enhancement of the shadow regions from left to right gradually using brightness manipulation only to the final image after complete pyramid collapse, brighten up the image without enhancing the dynamic range of the image.

Figure 7:
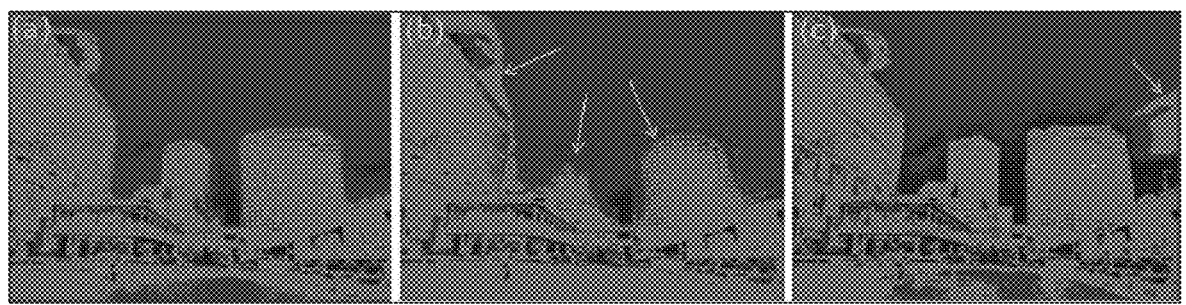
FIG. 7 illustrates detailed analysis of the comparison of FIGS. 6A to 6C, according to an example of the present disclosure.
Figure 8:
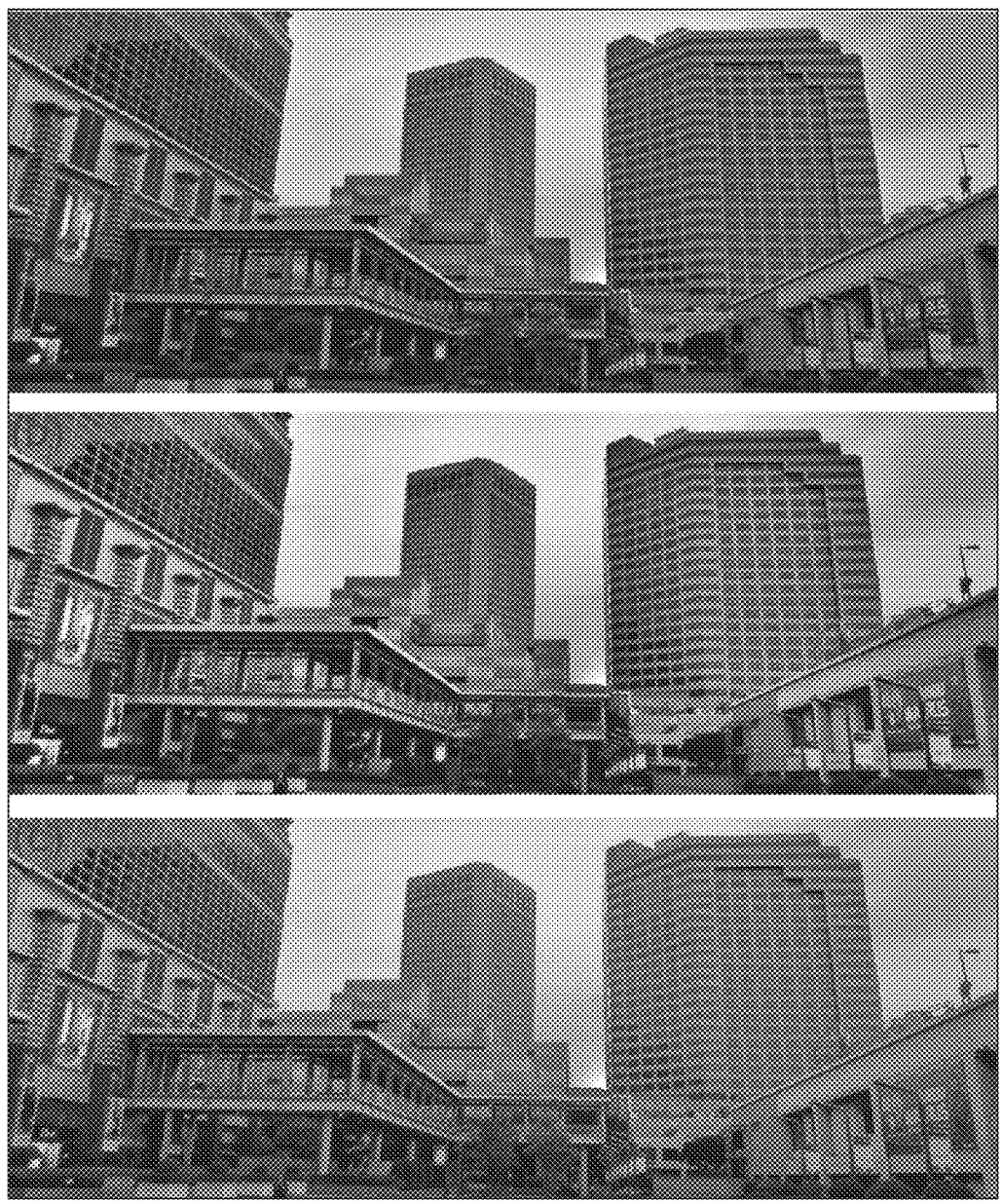
FIG. 8A illustrates examples of the final image, according to an example of the present disclosure.
FIG. 8B illustrates examples of the final image, according to an example of the present disclosure.
FIG. 8C illustrates examples of the final image, according to an example of the present disclosure.

FIG. 7A shows a ratio image between the middle image (mid-bright) and the right image (brightest) of FIG. 6A. Therein the grey regions show the pixel with large differences compared to the original image with the dark pixels are marginally affected. Similar, FIG. 7B shows a ratio image between the middle image (mid-bright) and the right image (brightest) of FIG. 6B and FIG. 7C shows a ratio image between the middle image (mid-bright) and the right image (brightest) of FIG. 6C. As can be seen from this comparison that with the method in accordance to the present disclosure by applying brightness manipulation to the intermediate layers during collapsing bright/shadow regions are well separated and thus, the brightness manipulation only influences dark regions while brighter regions are remain unchanged, preserving contrast. As shown in FIG. 7A, the present disclosure overperforms the other alternatives shown in FIGS. 6B, 6C and 7B, 7C, respectively. As visible in FIGS. 7B and 7C underexposed areas appear and a loss of contrast. FIGS. 8A, 8B and 8C showing the final image according to the method as described with respect to the FIGS. 6A, 6B and 6C, respectively. FIG. 8A showing the result of the present disclosure having a high dynamic range without loss of contrast and evenly distributed brightness without loss of details or underexposed areas in the image. FIG. 8B and FIG. 8C suffer from dark halos or contrast deterioration while the method of the present disclosure shown in FIG. 8A is able to manipulate brightness without producing artifacts nor loss of contrast.

Figure 9:
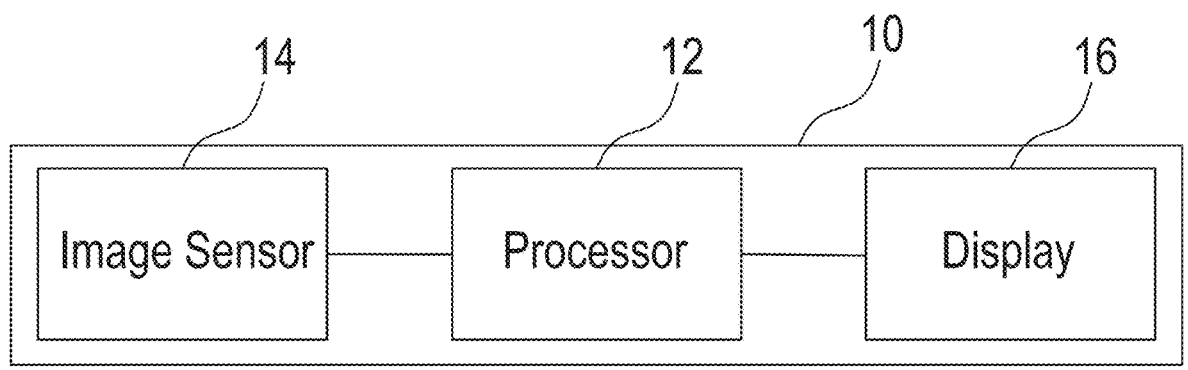
FIG. 9 illustrates a device, according to an example of the present disclosure.

Referring now to FIG. 9 showing a device 10 implementing the above described method. In at least some embodiments, the above-mentioned method is implemented in a processor 12, such as an image signal processor (ISP), an application-specific integrated circuit (ASIC), and Field Programmable Gate Array (FPGA), a general-purpose processor or a graphical processor. Further, the method can be hardware implemented or software implemented. In at least some embodiments, the Processor 10 is connected to an image sensor 14. The image sensor 14 can be a CCD-sensor a camera or the like. By the image sensor 14 initial image data can be acquired. This initial image data from the image sensor 14 is transmitted to the processor 12 to be processes according to the present disclosure. In at least some embodiments, the processor is further connected to a display 16 to display the final image.

The device 10 can be implemented by any kind of terminal, such as digital camera, smartphone, tablet, laptop or computer or the like. Further, although in FIG. 9 image sensor 14, processor 12, and display 16 are indicated to be implemented in one device 10, the individual modules can be implemented in more than one device. Thus, the image sensor 14 can be implemented for example in a smartphone for taking pictures. The initial image data acquired by the image sensor 14 then might be transmitted to a server or any other computational device by a communication connection. The server or other computational device may comprise the processor 12 to carry out the method according to the present disclosure. Then, the final image may be transmitted to a smartphone, tablet or any other device comprising a display 16 in order to display the final image. Therein, the final image from the server or other computational device may be transmitted to the same device that acquired the initial image data or another device. In at least some embodiments, the final image might be stored in a cloud storage or any other storage device and afterwards delivered on demand to the display device to display the final image.

What is claimed is:
1. A method for image processing, comprising:
acquiring initial image data from an image sensor;
deconstructing the initial image data in a plurality of image pyramid layers;
collapsing a first image pyramid layer with a second image pyramid layer to create an intermediate layer; and
collapsing the intermediate layer with a subsequent image pyramid layer to create a new intermediate layer and generate a final image based on the new intermediate layer and a last image pyramid layer,
wherein a tone-mapping operator is applied to at least one of the intermediate layers, and the tone-mapping operator is implemented as a brightness manipulation.

2. The method according to claim 1, wherein the tone-mapping operator is applied to at least one of the intermediate layers and at least one of the plurality of image pyramid layers.

3. The method according to claim 1, wherein the tone-mapping operator is applied locally to sub-areas of a respective intermediate layer and sub-areas of a respective image pyramid layer.

4. The method according to claim 1, wherein the tone-mapping operator is applied globally to a complete respective intermediate layer.

5. The method according to claim 1, wherein the tone-mapping operator is further applied to the final image, the image data or the first image pyramid layer.

6. The method according to claim 1, wherein collapsing the intermediate layer comprises:
for k=N−1, . . . , 1 obtaining $IMG_k(i,j)$ based on $UPSCALE(IMG_{k+1}(i,j))$ and $L_k(i,j)$, and
for k=N, obtaining $IMG_k(i,j)$ based on $L_k(i,j)$ for an N image pyramid layer,
wherein $L_k(i,j)$ is a k image pyramid layer, UPSCALE is a resolution adaption function between the k+1 image pyramid layer and the k image pyramid layer, $IMG_k(i,j)$ is a respective intermediate layer and $IMG_{k=1}$ being the final image.

7. The method according to claim 1, wherein the tone-mapping operator comprises:
$IMG_k(i,j)$=ToneMapping($IMG_k(i,j)$) or
$L_k(i,j)$=ToneMapping($L_k(i,j)$),
wherein $L_k(i,j)$ is a k image pyramid layer and $IMG_k(i,j)$ is a respective intermediate layer.

8. The method according to claim 1, wherein the initial image data is deconstructed into a Laplacian-Pyramid, wherein the last image pyramid layer is a Laplacian-filtered image with reduced resolution of the initial image data and the subsequent image pyramid layers are Laplacian-filtered images of a previous image pyramid layer with reduced resolution.

9. The method according to claim 1, wherein the brightness manipulation is implemented as one of a functional relationship, a Gamma-function, a contrast enhancing sigmoid function.

10. The method according to claim 1, wherein the brightness manipulation is determined in dependence on one or more of: a scene content, ambience properties, total gain of the image sensor, noise of the image sensor, histogram of brightness and user preferences.

11. The method according to claim 1, wherein the brightness manipulation is implemented as Look-Up-Table.

12. The method according to claim 1, wherein a total tone-mapping between the image data and the final image is evenly distributed between the tone-mapping of more than one of the intermediate layers.

13. An image signal processor (ISP) configured to carry out a method for image processing, the method comprising:
acquiring initial image data from an image sensor;
deconstructing the initial image data in a plurality of image pyramid layers;
collapsing a first image pyramid layer with a second image pyramid layer to create an intermediate layer; and
collapsing the intermediate layer with a subsequent image pyramid layer to create a new intermediate layer and generate a final image based on the new intermediate layer and a last image pyramid layer,
wherein a tone-mapping operator is applied to at least one of the intermediate layers, and the tone-mapping operator is implemented as a brightness manipulation.

14. The image signal processor according to claim 13, wherein the tone-mapping operator is applied to at least one of the intermediate layers and at least one of the plurality of image pyramid layers.

15. The image signal processor according to claim 13, wherein the tone-mapping operator is applied locally to sub-areas of a respective intermediate layer and sub-areas of a respective image pyramid layer.

16. The image signal processor according to claim 13, wherein the tone-mapping operator is applied globally to a complete respective intermediate layer.

17. The image signal processor according to claim 13, wherein the tone-mapping operator is further applied to the final image, the image data or the first image pyramid layer.

18. The image signal processor according to claim 13, wherein collapsing the intermediate layer comprises:
for k=N−1, . . . , 1, obtaining $IMG_k(i,j)$ based on $UPSCALE(IMG_{k+1}(i,j))$ and $L_k(i,j)$, and
for k=N, obtaining $IMG_k(i,j)$ based on $L_k(i,j)$ for an N image pyramid layer,
wherein $L_k(i,j)$ is a k image pyramid layer, UPSCALE is a resolution adaption function between the k+1 image pyramid layer and the k image pyramid layer, $IMG_k(i,j)$ is a respective intermediate layer and $IMG_{k=1}$ being the final image.

19. A terminal device, comprising: an image signal processor (ISP) and an image sensor connected to the ISP to acquire the image data and providing the image data to the ISP, wherein the ISP is configured to carry out a method for image processing, the method comprising:
acquiring initial image data from an image sensor;
deconstructing the initial image data in a plurality of image pyramid layers;
collapsing a first image pyramid layer with a second image pyramid layer to create an intermediate layer; and
collapsing the intermediate layer with a subsequent image pyramid layer to create a new intermediate layer and generate a final image based on the new intermediate layer and a last image pyramid layer,
wherein a tone-mapping operator is applied to at least one of the intermediate layers, and the tone-mapping operator is implemented as a brightness manipulation.

* * * * *